United States Patent
Holland et al.

(10) Patent No.: US 11,571,852 B2
(45) Date of Patent: Feb. 7, 2023

(54) MULTI-FILAMENT THREE-DIMENSIONAL PRINTING

(71) Applicant: MakerBot Industries, LLC, Brooklyn, NY (US)

(72) Inventors: Samuel Holland, Brooklyn, NY (US); Mark Waller, Greenfield, MA (US); Carlos Fernandez Arreola, Brooklyn, NY (US); Mark Palmer, Astoria, NY (US); Taylor S. Goodman, New York, NY (US); Kevin C. Rand, New York, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 439 days.

(21) Appl. No.: 16/568,507

(22) Filed: Sep. 12, 2019

(65) Prior Publication Data

US 2020/0001590 A1  Jan. 2, 2020

Related U.S. Application Data

(63) Continuation of application No. 15/395,287, filed on Dec. 30, 2016, now abandoned.
(Continued)

(51) Int. Cl.
*B29C 64/209* (2017.01)
*B33Y 50/02* (2015.01)
(Continued)

(52) U.S. Cl.
CPC .......... *B29C 64/209* (2017.08); *B29C 64/118* (2017.08); *B29C 64/336* (2017.08);
(Continued)

(58) Field of Classification Search
CPC ........ B29C 64/209; B33Y 50/02; B33Y 30/00
See application file for complete search history.

(56) References Cited

U.S. PATENT DOCUMENTS 5,121,329 A * 6/1992 Crump ................... B33Y 40/00
                                                   700/119
5,836,068 A   11/1998 Bullen et al.
(Continued)

OTHER PUBLICATIONS

USPTO, "U.S. Appl. No. 15/395,287 Final Office Action dated Jun. 13, 2019", 12 pages.
(Continued)

*Primary Examiner* — Alison L Hindenlang
*Assistant Examiner* — Virak Nguon
(74) *Attorney, Agent, or Firm* — Strategic Patents, P.C.

(57) ABSTRACT

An extruder of a three-dimensional printer may be coupled with one or more filament tubes, each filament tube having its own supply of filament. The extruder may include a drive gear rotatable in a first direction to advance a filament from a filament tube toward at least one extrusion opening defined by the extruder and rotatable in a second direction, opposite the first direction, to advance another filament from a different filament tube toward the at least one extrusion opening defined by the extruder. Also, as one filament is advanced by the drive gear, another filament may be retracted by the drive gear to improve the switching of filaments in a three-dimensional printing process. The extruder may work in conjunction with a filament supply-side drive system that feeds filament into one or more filament tubes, reducing a pull force exerted by the drive gear of the extruder.

19 Claims, 3 Drawing Sheets

Related U.S. Application Data (60) Provisional application No. 62/272,980, filed on Dec. 30, 2015.

(51) Int. Cl.
   *B29C 64/336*   (2017.01)
   *B29C 64/118*   (2017.01)
   *B33Y 30/00*    (2015.01)
   *B29K 105/00*   (2006.01)

(52) U.S. Cl.
   CPC ...... *B33Y 50/02* (2014.12); *B29K 2105/0067* (2013.01); *B33Y 30/00* (2014.12)

(56) References Cited

U.S. PATENT DOCUMENTS

| | | | |
|---|---|---|---|
| 7,027,887 B2 | 4/2006 | Gaylo et al. | |
| 7,172,715 B2 | 2/2007 | Swanson et al. | |
| 7,604,470 B2 | 10/2009 | LaBossiere et al. | |
| 7,625,198 B2 | 12/2009 | Lipson et al. | |
| 7,625,200 B2 | 12/2009 | Leavitt | |
| 2007/0228590 A1* | 10/2007 | LaBossiere | B33Y 30/00 |
| | | | 264/40.1 |
| 2013/0089642 A1 | 4/2013 | Lipson et al. | |
| 2014/0050811 A1 | 2/2014 | Lipton et al. | |
| 2016/0185042 A1* | 6/2016 | Toh | B29C 64/209 |
| | | | 425/132 |
| 2017/0190109 A1 | 7/2017 | Holland et al. | |
| 2017/0203507 A1* | 7/2017 | Leavitt | B29C 48/92 |

OTHER PUBLICATIONS

USPTO, "U.S. Appl. No. 15/395,287 Non-Final Office Action dated Jan. 28, 2018", 12 pages.

\* cited by examiner

MULTI-FILAMENT THREE-DIMENSIONAL PRINTING

CROSS-REFERENCE TO RELATED APPLICATIONS

This application is continuation of U.S. patent application Ser. No. 15/395,287 filed on Dec. 30, 2016, which claims the benefit under 35 U.S.C. § 119(e) of U.S. Provisional Application No. 62/272,980 filed on Dec. 30, 2015, where the entire contents of each are hereby incorporated by reference.

TECHNICAL FIELD

The disclosure relates to multi-filament three-dimensional printing.

BACKGROUND

Three dimensional printers can create physical objects from digital designs. Current printers can use a variety of different build materials for greater flexibility in realizing aesthetic or functional objects. Switching between different build materials can be challenging in extrusion-based processes.

SUMMARY

An extruder of a three-dimensional printer may be coupled with one or more filament tubes, each filament tube having its own supply of filament. The extruder may include a drive gear rotatable in a first direction to advance a filament from a filament tube toward at least one extrusion opening defined by the extruder and rotatable in a second direction, opposite the first direction, to advance another filament from a different filament tube toward the at least one extrusion opening defined by the extruder. Also, as one filament is advanced by the drive gear, another filament may be retracted by the drive gear to improve the switching of filaments in a three-dimensional printing process. The extruder may work in conjunction with a filament supply-side drive system that feeds filament into one or more filament tubes, reducing a pull force exerted by the drive gear of the extruder.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to illuminate better the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above," "below," "up," "down," and the like, are words of convenience and are not to be construed as limiting terms unless specifically stated.

The following description emphasizes three-dimensional printers using fused deposition modeling or similar techniques where a bead of material is extruded in a layered series of two dimensional patterns as "roads" or "paths" to form a three-dimensional object from a digital model. It will be understood, however, that numerous additive fabrication techniques are known in the art including, without limitation, multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

Figure 1:
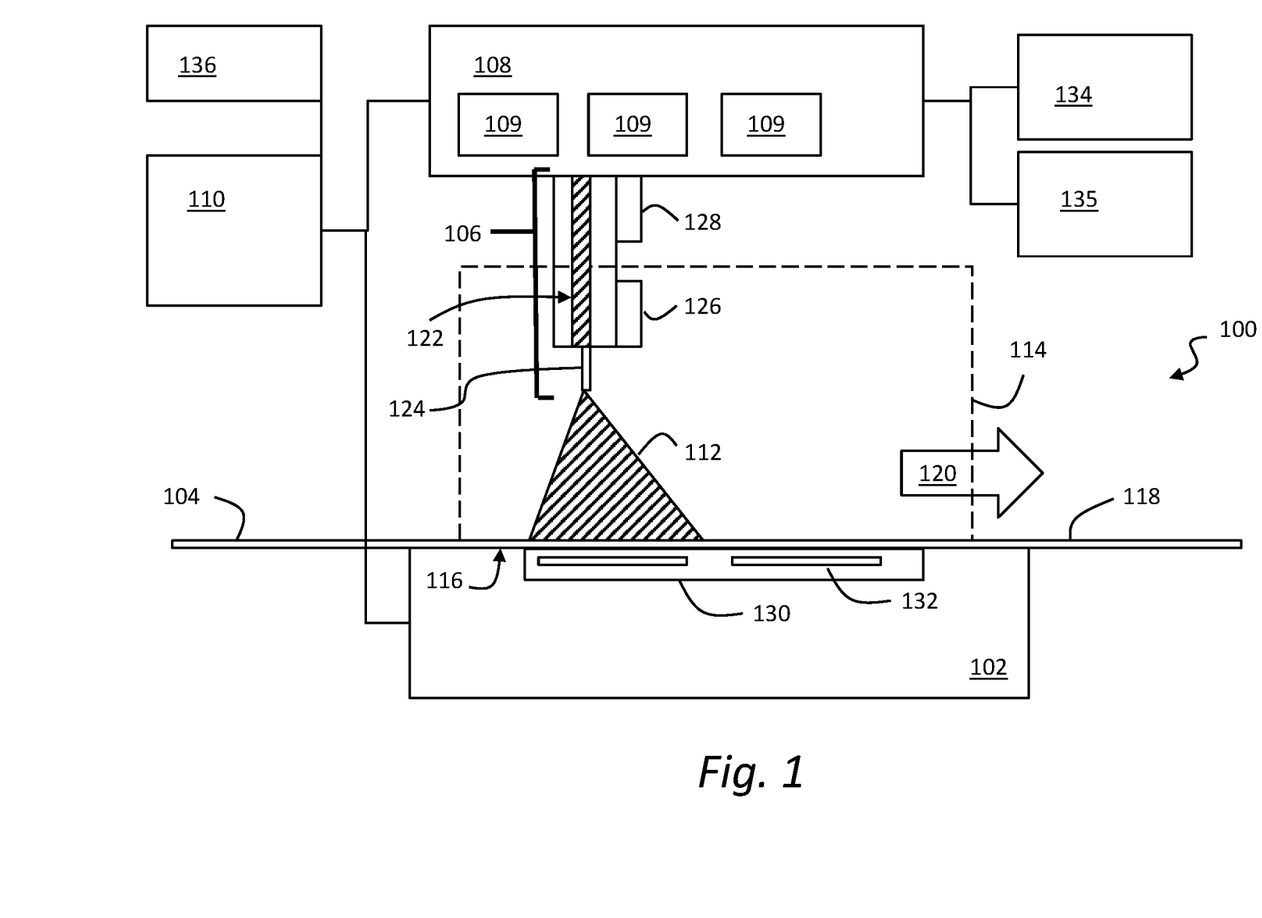
FIG. 1 is a block diagram of a three-dimensional printer.

FIG. 1 is a block diagram of a three-dimensional printer. In general, a printer 100 may include a build platform 102, a conveyor 104, an extruder 106, an x-y-z positioning assembly 108, and a controller 110 that cooperate with one another to fabricate an object 112 within a working volume 114 of the printer 100.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as thermoelectric heating and/or cooling devices (e.g., resistive elements that convert electrical current into heat, Peltier effect devices that can create a heating or cooling affect, and combinations thereof). Accordingly, the thermal element 130 may be a heater that provides active heating to the build platform 102, a cooling element that provides active cooling to the build platform 102, or a combination of these. The heater 130 may be coupled in a communicating relationship with the controller 110 for the controller 110 to controllably impart heat to or remove heat from the surface 116 of the build platform 102. Thus, for example, the thermal element 130 may include an active cooling element positioned within or adjacent to the build platform 102 to controllably cool the build platform 102.

It will be understood that a variety of other techniques may additionally, or alternatively, be employed to control a temperature of the build platform 102. For example, the build platform 102 may use a gas cooling or gas heating device such as a vacuum chamber in an interior thereof, which may be quickly pressurized to heat the build platform 102 or vacated to cool the build platform 102 as desired. As another non-exclusive example, a stream of heated or cooled gas may be applied directly to the build platform 102 before, during, and/or after a build process.

The conveyer 104 may include a sheet 118 of material that moves in a path 120 through the working volume 114. Within the working volume 114, the path 120 may pass proximal to the surface 116 of the build platform 102—that is, resting directly on or otherwise supported by the surface 116—to provide a rigid, positionally stable working surface for a build. It will be understood that, while the path 120 is depicted as a unidirectional arrow, the path 120 may be bidirectional, such that the conveyer 104 can move, for example, in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor 104 may, additionally or alternatively, include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may further, or instead, include sections of rigid material joined by flexible links.

A working surface of the sheet 118 (e.g., an area on the top surface of the sheet 118 within the working volume 114) may be treated to assist with adhesion of build material to the surface 118 and/or to facilitate removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to facilitate build processes as described herein. For example, the chemical treatment may include deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed onto the conveyer 104 prior to fabrication of the object 112.

In one aspect, the conveyer 104 may include a sheet of disposable, one-use material fed from a dispenser and consumed with each successive build.

In one aspect, the conveyer 104 may include a number of different working areas with different surface treatments adapted for different build materials or processes. For example, different areas may have different textures (e.g., smooth, abraded, grooved, etc.). Additionally, or alternatively, different areas may be formed of different materials. Further, or instead, different areas may have or receive different chemical treatments. Thus, it should be appreciated that a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 defining an exit port with a circular, oval, slotted or other cross-sectional profile that extrudes build material in a desired cross-sectional shape.

The extruder 106 may include a heater 126 to melt build materials (e.g., thermoplastic material) within the chamber 122 for extrusion through the extrusion tip 124 in melted form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also, or instead, include a motor 128 to push the build material into the chamber 122, through the extrusion tip 124, or a combination thereof.

In general operation (and by way of example rather than limitation), a build material, such as ABS plastic in filament form, may be fed into the chamber 122 from a spool by the motor 128, melted by the heater 126, and extruded from the extrusion tip 124. By controlling process parameters (e.g., one or more of a rate of the motor 128 and the temperature of the heater 126) the build material may be extruded at a controlled volumetric rate. It will be understood that a variety of techniques may be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be movable to three-dimensionally position the extruder 106 and the extrusion tip 124 within the working volume 114. Thus, for example, by controlling the volumetric rate of delivery for the build material and the x, y, z position of the extrusion tip 124, the object 112 may be fabricated in three dimensions by depositing successive layers of material in two-dimensional patterns derived (e.g., two-dimensional patterns derived from cross-sections of a computer model or other computerized representation of the object 112). The x-y-z positioning assembly 108 may, for example, include a number of stepper motors 109 to control independently a position of the extruder within the working volume along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. Additionally, or alternatively, the conveyor 104 may be x, y, and z positionable, and the extruder 106 may be, optionally, stationary. Further, or instead, the extruder 106 may be x, y, and z positionable while the conveyer 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus, in certain instances, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system may serve as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through a network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor embedded within or attached below the surface of the build platform 102. This may also or instead include an infrared detector directed at the surface 116 of the build platform 102 or the sheet 118 of material of the conveyer 104. Other sensors that may be usefully incorporated into the printer 100 as the sensor 134 include, without limitation, a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used, for example, to ensure that the object 112 is removed from the conveyer 104 prior to beginning a new build at that location on the working surface (e.g., the surface 116 of the build platform 102). Thus, the sensor 134 may be used to determine whether an object is present that should not be, or to detect when an object is absent, or a combination thereof. The feedback from this sensor 134 may be used by the controller 110 to issue processing interrupts or otherwise control operation of the printer 100.

The sensor 134 may include a sensor that detects a position of the conveyer 104 along the path. This information may be obtained, for example, from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (e.g., a radiant heater or forced hot air) to heat the working volume 114 to maintain the object 112 at a fixed, elevated temperature throughout a build. The sensor 134 may also, or instead, include a cooling element to maintain the object 112 at a predetermined sub-ambient temperature throughout a build. It should be appreciated that a heater included in the sensor 134 may be instead of, or in addition to, the thermal element 130.

The sensor 134 may also or instead include at least one video camera. The video camera may generally capture images of the working volume 114, the object 112, or any other hardware associated with the printer 100. The video camera may provide a remote video feed through the network interface 136. In such instances, the feed may be available to remote users through a user interface maintained, for example, by remote hardware, or, further or instead, the feed may be available within a web page provided by a web server hosted by the three-dimensional printer 100. Thus, in certain implementations, there is a user interface adapted to present a video feed from at least one video camera of a three-dimensional printer to a remote user through a user interface.

The sensor 134 may also or instead include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In some instances, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including, without limitation, pass/fail decisions, error detection (and corresponding audible or visual alerts), shape detection, position detection, orientation detection, collision avoidance, and combinations thereof.

The printer 100 may include other hardware 135, which may be, for example, input devices including any one or more of the following: a keyboard, a touchpad, a mouse, switches, dials, buttons, and motion sensors. Additionally, or alternatively, the other hardware 135 may be, for example, output devices including any one or more of the following: a display, a speaker or other audio transducer, and light emitting diodes. Other hardware 135 may also or instead include a variety of cable connections and/or hardware adapters for connecting, for example, to external computers, external hardware, external instrumentation data acquisition systems, and combinations thereof.

The printer 100 may include, or be connected in a communicating relationship with, the network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols). The controller 110 may be configured to control participation by the printer 100 in any network to which the network interface 136 is connected, such as by autonomously connecting to the network to retrieve printable content, or responding to a remote request for status or availability.

Devices, systems, and methods for a multi-filament three-dimensional printing will now be described. The devices, systems, and methods may include an extruder coupled with one or more filament tubes, with each filament tube having its own supply of filament. The extruder may include a drive gear rotatable in a first direction to advance a filament from a filament tube toward at least one opening defined by the extruder and rotatable in a second direction to advance another filament from a different filament tube toward the at least one opening. The extruder may be used with a filament supply-side drive system that feeds filament into the filament tubes, reducing a load on the drive gear of the extruder.

Although the term "dual extruder" may be used herein, one skilled in the art will recognize that the extruders described herein may be configured for the extrusion of more than two build materials, and thus the term "dual extruder" should be interpreted to generally include multi-build material extruders (e.g., extruders capable of depositing more than one filament of build material during a three-dimensional printing operation).

Figure 2:
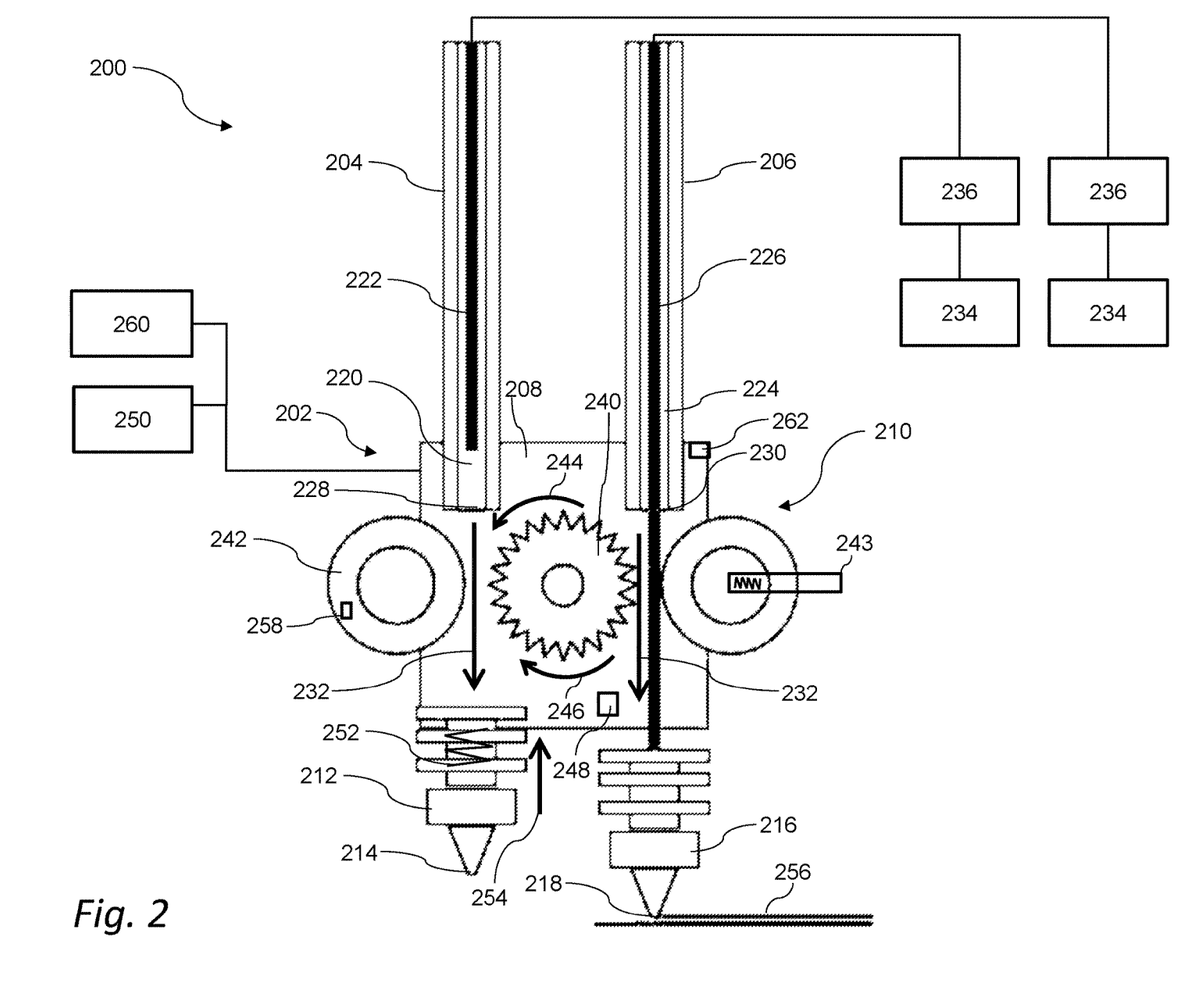
FIG. 2 is a schematic representation of an extruder for a three-dimensional printer.

FIG. 2 is a schematic representation of an extruder for a three-dimensional printer. A device 200 may include an extruder 202 switchable between different filaments of build material for use in three-dimensional fabrication systems including, for example, a three-dimensional printer as described above with reference to FIG. 1. In general, the extruder 202 may include a motor for driving and/or retracting two or more filaments of build material. It should be appreciated that such movement of two or more filaments may switching between the two or more filaments of build material during a three-dimensional printing operation.

The device 200 may be used in combination with a supply-side drive system that is operable independently of a drive system included in the extruder 202. The supply-side drive system may supply filament to the device 200 (e.g., load filament into and out of the extruder 202), and the device 200 may drive the filament for extrusion. The pull force required by the extruder 202 may be reduced to facilitate using a motor that is simplified or scaled-down relative to other extruders. Further, or instead, a supply-side drive system may provide for the automatic loading of filament, swapping of filament, and multi-filament extrusion with only one motor included in the extruder 202. The single motor may also, or instead, drive different filaments of build material by reversing a turning direction of a drive gear, as described herein.

The device 200 may include an extruder 202 engaged with a first tube 204 and a second tube 206.

The extruder 202 may be a multi-build material or multi-filament extruder. For example, as shown in FIG. 2, the extruder 202 may be a dual extruder. Alternatively, the extruder 202 may be a single filament extruder, or the extruder 202 may extrude more than two filaments. The extruder 202 may include a housing 208, a drive system 210, and one or more nozzles. Each nozzle may define an extrusion opening. For example, a first nozzle 212 may define a first extrusion opening 214 and a second nozzle 216 may define a second extrusion opening 218. In an additional or in an alternate aspect, the extruder 202 may feed a plurality of filaments through a single port.

The first tube 204 and the second tube 206 may each define a respective interior channel. Each interior channel is a respective pathway for feeding a filament to the extruder 202. For example, the first tube 204 may define a first interior channel 220 for a first filament 222, and the second tube 206 may define a second interior channel 224 for a second filament 226. In implementations in which the extruder 202 defines a single extrusion port, the first interior channel 220 of the first tube 204 and the second interior channel 224 of the second tube 206 may feed into the single extrusion port through a Y-connector or similar fitting.

The first filament 222 and the second filament 226 may include different colored filaments, filaments that are made from different materials, or filaments that may otherwise include one or more different properties. The first filament 222 and the second filament 226 may instead be the same type of filament. In certain aspects, the first filament 222 and the second filament 226 may be preheated before being melted for extrusion by the extruder 202. This preheating may occur in one or more of a filament spool or cartridge, within the filament tubes, in the extruder 202, or otherwise in the device 200.

The first tube 204 and the second tube 206 may each include a respective output end for coupling with the extruder 202. For example, the first tube 204 may include a first output end 228, and the second tube 206 may include a second output end 230. In this manner, the housing 208 of the extruder 202 may be engageable with the first output end 228 of the first tube 204 and with the second output end 230 of the second tube 206 such that the extruder 202 is coupled with the first tube 204 and the second tube 206 through such engagement. The extruder 202 may be coupled with the first tube 204 and with the second tube 206 such that there are one or more feed paths 232 disposed between the extruder 202 and the first and second tubes 204, 206. The feed paths 232 may be respective pathways for the filaments. For example, each pathway may extend between the respective interior channel of the respective filament tube, through the housing 208 of the extruder 202, into the at least one nozzle of the extruder 202, and out of the at least one extrusion opening for printing. The filaments may be provided by one or more sources 234 of build material (e.g., a filament spool or cartridge) coupled to one or more supply-side drive systems 236 that advance the filament toward the extruder 202.

The extruder 202 may include a drive system 210 (e.g., separate from the one or more supply-side drive systems 236) for advancing and/or retracting one or more filaments of build material. The drive system 210 of the extruder 202 may include a rotary drive gear 240 and one or more guides 242 to engage the filament with the rotary drive gear 240. The rotary drive gear 240 may rotate in a first direction 244 to advance the first filament 222 toward the first extrusion opening 214, and the rotary drive gear 240 may rotate in a second direction 246 to advance the second filament 226 toward the second extrusion opening 218. The second direction 246 may, for example, oppose the first direction 244. Additionally, when the rotary drive gear 240 is rotated in the first direction 244, the second filament 226 may be retracted into the extruder 202 and vice-versa.

The guide 242 may include a wheel, pinch roller, or other mechanism that applies a force against a filament to engage the filament with the rotary drive gear 240 while the rotary drive gear 240 is rotating to facilitate low-friction axial motion of the filament. The guide 242 may include, for example, a bearing such that the guide 242 rotates freely on the bearing to reduce axial force along the filament, as compared to a configuration without a bearing. The guide 242 may also or instead include one or more bearings along a radial perimeter of the guide 242. In certain aspects, the guide 242 includes a motor that drives the guide 242. For example, the motor may control rotation of the guide 242 at a speed synchronized to the rotary drive gear 240 or at some other suitable rate.

In general, the guide 242 may apply a normal force to the filament, such that the force is directed toward the rotary drive gear 240. The normal force may be a constant or variable force. The guide 242 may be, for example, fixed. Additionally, or alternatively, the guide 242 may be retained by a spring arm 243, an actuator, or a combination thereof such that the guide 242 is adaptable to filaments of varying diameter while maintaining the normal force. In certain aspects, the guide 242 includes an encoder 258 in communication with a controller 260 of a three-dimensional printer such that the encoder 258 can provide feedback to the controller 260.

The extruder 202 may include a heating element 248 for liquefying a filament of build material. The device 200 may also, or instead, include an x-y-z positioning system 250 movable to position the extruder 202 within a volume of a three-dimensional printer.

In certain implementations, the nozzles of the extruder 202 facilitate multi-filament extrusion. For example, one or more of the nozzles may be in an extended position when a build material is extruded through the one or more nozzles and in a retracted position when a build material is not being extruded through the one or more nozzles such that the one or more nozzles are less likely to interfere with a print process when not in use. For example, one or more of the first nozzle 212 and the second nozzle 216 may include a spring 252 that biases the nozzle in a direction 254 opposing the feed path 232 of filament through the respective nozzle. It should be appreciated that, as used herein the spring 252 can be any passive or active mechanism that can resiliently oppose a force in a predetermined direction and, thus, can include, by way of example and not limitation, one or more of a coil spring, a spring arm, and a torsion spring. In certain aspects, the biasing force applied by the spring 252 may be less than a driving force provided by the rotary drive gear 240 when advancing filament through the nozzle such that the respective first nozzle 212 and second nozzle 216 is extended a predetermined amount in a direction of the feed path 232 when the filament is advanced through the respective first nozzle 212 and second nozzle 216 during a three-dimensional printing process. In this manner, the spring 252 may maintain the respective first nozzle 212 and second nozzle 216 in a retracted position when the filament is not being advanced through the respective first nozzle 212 and second nozzle 216. In FIG. 2, the first nozzle 212 is shown in a retracted position (not in use) and the second nozzle 216 is shown in the extended position where it is extruding melted filament 256.

While the first nozzle 212 and the second nozzle 216 have been described as each including the spring 252 to bias the respective first nozzle 212 and second nozzle 216, it should be appreciated one or both of the first nozzle 212 and the second nozzle 216 can additionally, or alternatively, be movable such that the force of retraction of the filament pulls the respective one of the first nozzle 212 or the second nozzle 216 upward with the filament, and the force of extrusion pushes the respective one of the first nozzle 212 or the second nozzle 216 downward. In such aspects, mechanical elements, such as one or more ridges, protrusions, or a combination thereof, may hold the respective one of the first nozzle 212 and the second nozzle 216 in its position—retracted or extended. The force of extrusion and retraction may be greater than the force exerted by the mechanical elements to hold the respective one of the first nozzle 212 and the second nozzle 216 such that the nozzle moves from one position to another, depending upon whether filament is being extruded or retracted. That is, the nozzle may include one or more mechanical elements securing the respective one of the first nozzle 212 and the second nozzle 216 in an extended position when filament is advanced through the respective one of the first nozzle 212 and the second nozzle 216 during a three-dimensional printing process and a retracted position when the filament is retracted in the extruder. The mechanical elements may apply a first force to secure the respective one of the first nozzle 212 and the second nozzle 216 in the extended position, where the first force is less than a retraction force applied to the filament by the rotary drive gear 240 to allow movement of the respective one of the first nozzle 212 and the second nozzle 216 from the extended position to the retracted position when filament is retracted in the extruder 202. The mechanical elements may apply a second force to secure the respective one of the first nozzle 212 and the second nozzle 216 in the retracted position, where the second force is less than an advancement force applied to the filament by the rotary drive gear 240 to allow movement of the respective one of the first nozzle 212 and the second nozzle 216 from the retracted position to the extended position when filament is advanced through the respective one of the first nozzle 212 and the second nozzle 216.

In addition, or in the alternative, the extruder 202 may define a single extrusion port. For example, the extruder 202 may include a turret coupled with one or more of the first tube 204 and the second tube 206. The turret may be rotatable to place one or more of the first output end 228 and the second output 230 end into alignment with the rotary drive gear 240.

The extruder 202 may also, or instead, be releasably coupled to the first output end 228 of the first tube 204 and releasably coupled to the second output end 230 of the second tube 206 to facilitate swapping one or more of the first tube 204 and the second tube 206 (e.g., swapping one or more of the first tube 204 and the second tube 206 for a third tube). The extruder 202 may also, or instead, include a locking mechanism 262 to couple one or more of the first output end 228 of the first tube 204 and the second output end 230 of the second tube 206 to the extruder 202 such as, for example, one or more of the first output end 228 of the first tube 204 and the second output end 230 of the second tube 206 are aligned for coupling with the extruder 202.

Figure 3:
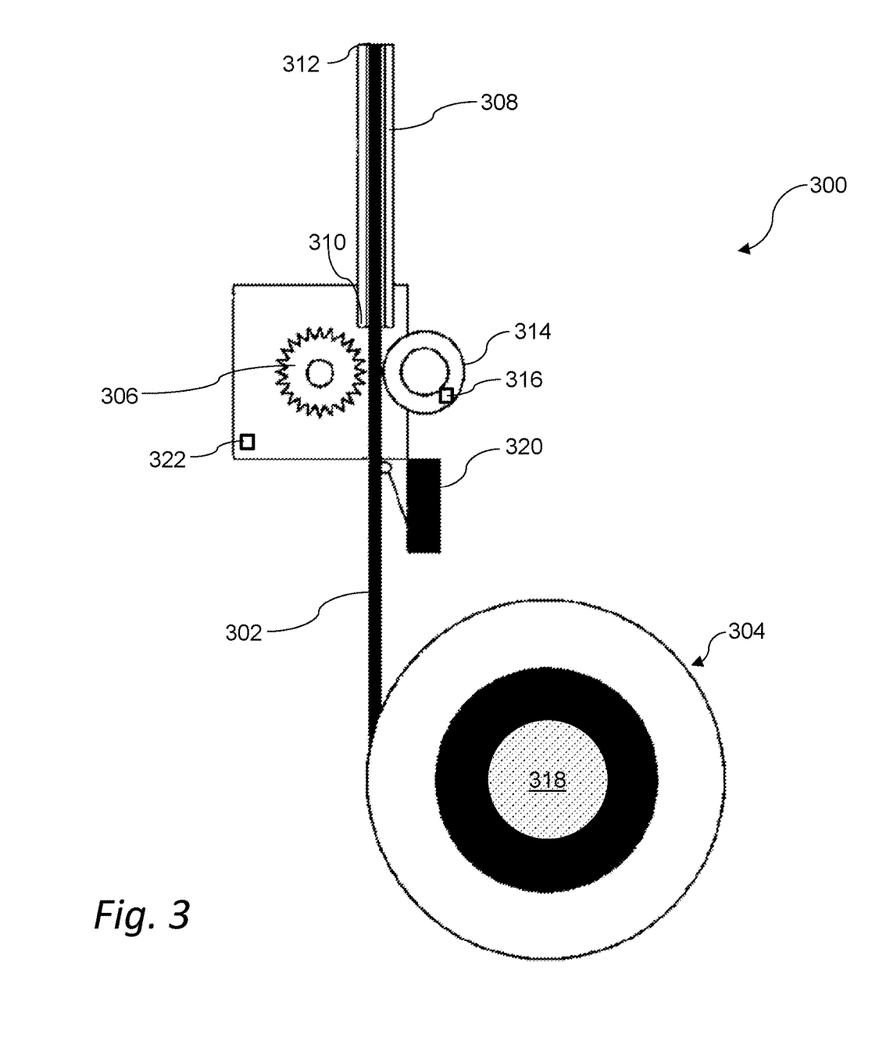
FIG. 3 is a schematic representation of a supply-side drive system for a filament of build material.

FIG. 3 is a schematic representation of a supply-side drive system for a filament of build material. A drive system 300 may be used in a three-dimensional fabrication system that utilizes a multi-filament extruder (e.g., the extruder 202 discussed above with reference to FIG. 2). The drive system 300 may also, or instead, be used with another extruder, such as an extruder having a motor for advancing a filament of build material. The drive system 300 may be disposed, for example, upstream from an extruder of a three-dimensional printer, where the drive system 300 may be used to drive filament 302 to feed an extruder. For example, the drive system 300 may be disposed on a supply 304 of filament 302 or disposed downstream of the supply 304 of filament 302, between an extruder and the supply 304. In certain aspects, the drive system 300 may be disposed substantially near the supply 304 of filament 302 (e.g., just downstream from the supply 304). In this manner, the drive system 300 shall be understood to be a supply-side drive system. Each supply 304 of filament 302 may include its own drive system 300 associated therewith.

The drive system 300 may include a drive gear 306 (and, optionally, an associated motor) positioned to drive a filament 302 of build material into a filament tube 308. The drive system 300 may further include a guide 314, such as a roller. The guide 314 may be spring loaded to apply a transverse force (e.g., a force normal to the axis of the filament 302 or normal to the tangent of the drive gear 306) to the filament 302 to secure the filament 302 against the drive gear 306 to reduce, for example, the likelihood of the filament 302 skipping when in use. In an aspect, the guide 314 may include an encoder 316 in communication with a controller of a three-dimensional printer to provide feedback to the controller.

The supply 304 of filament 302 may include a spool of filament 302 (as shown in the figure), a cartridge of filament 302, or a combination thereof. In an aspect, the drive system 300 includes a holder 318 for the supply 304 of filament 302, such as a filament spool holder. The holder 318 may also, or instead, include one or more of a filament spool caddy, a filament spool drawer, and a filament cartridge.

The filament tube 308 may include an input end 310, an output end 312, and may define an interior channel 314 forming a pathway for the filament 302 between the input end 310 and the output end 312. The drive gear 306 may drive the filament 302 into the interior channel 314 at the input end 310 of the filament tube 308, through the interior channel 314, and out of the output end 312 of the filament tube 308. At the output end 312 of the filament tube 308, the filament 302 may be fed into an extruder. Additionally, or alternatively, the output end 312 of the filament tube 308 may be coupled to an extruder.

The filament tube 308 may be at least partially formed of polytetrafluoroethylene (PTFE). The filament tube 308 may also, or instead, be at least partially formed from other materials including, without limitation, metal, glass, other plastics, ceramic, rubber, and combinations thereof.

One or more drive systems (such as the drive system 300) may cooperate with one or more extruders for extruding multiple filaments in a three-dimensional printing process. For example, one or more drive systems may be used to extrude multiple filaments simultaneously. Additionally, or alternatively, one or more drive systems may be used to extrude multiple filaments separately (e.g., one filament at a time). Each supply 304 of filament 302 may, for example, cooperate with its own drive system (e.g., a first drive system for a first filament, a second drive system for a second filament, a third drive system for a third filament, and so on). Each drive system may include its own associated motor, drive gear, filament tube, and so on. Alternatively, or in addition, different drive systems may share one or more components.

In certain aspects, the drive system 300 may operate independently of any other drive systems included upstream in a three-dimensional printing system (e.g., in an extruder of a three-dimensional printer). Thus, for example, the drive system 300 on the supply-side may operate independently of the rotary drive gear included in the extruder as discussed herein, for example, with reference to FIG. 2. In some aspects, the drive system 300 operates in a cooperating, coordinated manner with a rotary drive gear included in the extruder for driving the filament 302 (or otherwise with an extruder's motor or other drive system). For example, an extruder's rotary drive gear (such as the one described above with reference to FIG. 2) and the drive gear 306 of the drive system 300 on the supply-side may rotate at the same speed, or at some other related speed (e.g., a speed dependent upon a gearing ratio between the gears or other components of the drive systems). The extruder drive system and the drive system 300 on the supply-side may also or instead include one or more sensors 322 that sense a load on one or both of the motors in the different systems. The sensors 322 may send a signal to a controller that can control one or more of the extruder drive system and the drive system 300 on the supply side. For example, the rotational speed of one or more of the extruder's rotary drive gear and the drive gear 306 of the drive system 300 on the supply-side may be dynamically adjusted according to a sensed load (e.g., to balance a physical load between the motors, to maintain a target differential between the motors, to control a volumetric flow rate of build material, to control a linear rate of travel of the filament or other build material, or to otherwise control any parameter or condition of a fabrication process).

Implementations may include a three-dimensional printing system in which the drive system 300 automatically activates when filament 302 is placed for use in a three-dimensional printer (e.g., when the supply 304 of filament 302 is loaded into the three-dimensional printer). This may be accomplished, for example, through a switch 320 (e.g., a reed switch), which closes when the supply 304 of filament is loaded into the three-dimensional printer. The activation of the switch 320 may cause the drive gear 306 to rotate, sending the filament 302 towards the extruder of the three-dimensional printer.

Utilization of the drive system 300 on the supply-side can facilitate, for example, the use of a relatively small extruder motor, as the drive system 300 may assist the extruder motor with load, reducing a pull force needed to receive the filament 302. This can result in a smaller, faster, and lighter extruder compared to an extruder without such an assist, with fewer dropouts during three-dimensional prints.

The above systems, devices, methods, processes, and the like may be used in conjunction with, be supplemented by, or otherwise include a filament swapping system. The filament swapping system may include an extruder fitted with a connector (e.g., a magnet) for coupling with a corresponding connector disposed on a filament tube such that, when connected, the extruder and filament tube are aligned forming a feed path for a filament through the filament tube and the extruder. A tool rack may include a plurality of filament tubes secured within openings therein, e.g., filament tubes having different colored filaments. The openings of the tool rack may allow for the engagement of the extruder and a filament tube while further securing the filament tubes against an excursion by the extruder from a predetermined insertion path to facilitate breaking the coupling between the connectors to separate the filament tube from the extruder. In this manner, the extruder may swap filaments through engaging and decoupling with different filament tubes on the tool rack during a three-dimensional print.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system for a three-dimensional printer, the system comprising:
 a first drive system including a first drive gear positioned upstream from an extruder of the three-dimensional printer to advance a filament of build material toward the extruder;

a second drive system including a second drive gear positioned in the extruder of the three-dimensional printer, disposed upstream from a heating element thereof, to advance the filament through the extruder during a printing process before being melted by the heating element;

a sensor configured to sense an attribute of one or more of the first drive system and the second drive system; and a controller configured to receive a signal related to the sensed attribute from the sensor and, in response to the sensed attribute, to dynamically adjust one or more of the first drive system and the second drive system to balance a physical load caused by the filament between the first drive system and the second drive system.

2. The system of claim 1, wherein the controller changes rotational speed of one or more of the first drive gear and the second drive gear when dynamically adjusting one or more of the first drive system and the second drive system to drive the filament according to the sensed attribute.

3. The system of claim 1, wherein the controller, in response to the sensed attribute, is configured to maintain a target differential between the first drive system and the second drive system.

4. The system of claim 1, wherein the controller, in response to the sensed attribute, is configured to control a volumetric flow rate of build material through the extruder.

5. The system of claim 1, wherein the controller, in response to the sensed attribute, is configured to control a linear rate of travel of the filament of build material.

6. The system of claim 1, wherein the sensor is configured to sense the physical load caused by the filament experienced by one or more of the first drive system and the second drive system.

7. The system of claim 1, wherein the sensor includes an encoder.

8. The system of claim 1, wherein the first drive system is disposed on, or coupled to, a supply of build material.

9. The system of claim 8, wherein the first drive system includes a holder for the supply of build material.

10. The system of claim 1, wherein the first drive system is disposed between the extruder and a supply of build material.

11. The system of claim 1, wherein the first drive system is independently operable from the second drive system using the controller.

12. The system of claim 1, wherein the first drive system and the second drive system operate in coordination with one another.

13. The system of claim 1, wherein one or more of the first drive system and the second drive system includes a guide that applies a force to the filament, the force directed against the respective drive gear.

14. The system of claim 13, wherein the guide includes a roller and the force is provided by a spring arm that permits the roller to adapt to filaments of varying size while maintaining the force.

15. The system of claim 14, wherein the roller includes an encoder in communication with the controller.

16. The system of claim 1, wherein the first drive system automatically activates upon placement of filament in the first drive system.

17. The system of claim 1, wherein the extruder further includes a nozzle including a spring biasing the nozzle in a direction opposing a feed path of filament through the nozzle, the nozzle defining an extrusion opening of the extruder, and wherein a biasing force applied by the spring is less than a driving force provided by the second drive system advancing filament through the nozzle such that the nozzle is extended a predetermined amount in a direction of the feed path as filament is advanced through the nozzle during the printing process.

18. The system of claim 1, further comprising:

a first tube defining a first interior channel and having a first output end coupled to the extruder, wherein the first drive gear is positioned to drive a first filament into the first interior channel at a first input end of the first tube;

a second tube defining a second interior channel and having a second output end coupled to the extruder; and a third drive system including a third drive gear is positioned to drive a second filament into the second interior channel at a second input end of the first tube, wherein the second drive gear of the extruder includes a rotary drive gear rotatable in a first direction to advance the first filament toward an extrusion opening and rotatable in a second direction opposite the first direction to advance the second filament toward the extrusion opening.

19. The system of claim 18, further comprising a guide positioned to apply force to one or more of the first filament and the second filament for selective engagement with the rotary drive gear of the extruder.

* * * * *